US012620720B2

(12) United States Patent
Kim et al.

(10) Patent No.: US 12,620,720 B2
(45) Date of Patent: May 5, 2026

(54) TERAHERTZ BAND BEAMFORMING ANTENNA SYSTEM

(71) Applicant: KOREA UNIVERSITY RESEARCH AND BUSINESS FOUNDATION, Seoul (KR)

(72) Inventors: Moon Il Kim, Seoul (KR); Yang Woo Kim, Cheonan-si (KR); Yun Kyeong Koh, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 188 days.

(21) Appl. No.: 18/223,167

(22) Filed: Jul. 18, 2023

(65) Prior Publication Data

US 2024/0022000 A1 Jan. 18, 2024

(30) Foreign Application Priority Data

Jul. 18, 2022 (KR) ........................ 10-2022-0087892
Jul. 17, 2023 (KR) ........................ 10-2023-0092350

(51) Int. Cl.
*H01Q 13/06* (2006.01)
*H01Q 1/50* (2006.01)
*H01Q 3/34* (2006.01)
*H01Q 21/06* (2006.01)
*H01Q 23/00* (2006.01)

(52) U.S. Cl.
CPC ............... *H01Q 13/06* (2013.01); *H01Q 1/50* (2013.01); *H01Q 3/34* (2013.01); *H01Q 21/062* (2013.01); *H01Q 23/00* (2013.01)

(58) Field of Classification Search
CPC .......... H01Q 1/50; H01Q 1/2283; H01Q 3/26; H01Q 3/28; H01Q 3/30; H01Q 3/34; H01Q 3/36; H01Q 3/385; H01Q 3/40; H01Q 3/42; H01Q 13/06; H01Q 21/0031; H01Q 21/062; H01Q 21/064; H01Q 21/067; H01Q 23/00; H01P 1/30
See application file for complete search history.

(56) References Cited

U.S. PATENT DOCUMENTS

2005/0264372 A1* 12/2005 Choudhury ............. H01L 23/66 333/33
2018/0175506 A1* 6/2018 Park ................... H01Q 13/0233
2023/0198144 A1* 6/2023 Park ......................... H01Q 3/28 343/810

FOREIGN PATENT DOCUMENTS

KR 10-1999-0027314 A 4/1999
KR 10-2015-0059392 A 6/2015
KR 10-2016-0104125 A 9/2016

* cited by examiner

*Primary Examiner* — Robert Karacsony
(74) *Attorney, Agent, or Firm* — NSIP Law

(57) ABSTRACT

Disclosed is a terahertz band beamforming antenna system. A terahertz band beamforming antenna system includes: a metal waveguide top portion; and a metal waveguide bottom portion which is coupled to the metal waveguide top portion, and at which an antenna portion including a feed transmission line and a radiation antenna is positioned, wherein the metal waveguide top portion and the metal waveguide bottom portion may have radiation openings, and may be coupled to seal at least a top surface, a bottom surface, and both side surfaces of the antenna portion.

7 Claims, 13 Drawing Sheets

TERAHERTZ BAND BEAMFORMING ANTENNA SYSTEM

CROSS REFERENCE TO RELATED APPLICATIONS

This application claims under 35 U.S.C. § 119 (a) the benefit of Korean Patent Application Nos. 10-2022-0087892 filed on Jul. 18, 2022, and 10-2023-0092350 filed on Jul. 17, 2023, the entire contents of which are incorporated herein by reference.

TECHNICAL FIELD

The present invention relates to a terahertz band beamforming antenna system.

BACKGROUND ART

In the late 2020s, it is expected to utilize a beam-forming system applied with multi-antenna in the terahertz frequency band of 100 GHz or more. To this end, various studies are being preceded to implement multiple antennas.

As the next-generation terahertz band beam-forming system structure, UCSB proposes radio wave radiation through a 1-D array antenna on a plane. However, this has a problem in that beam forming in up and down directions is possible, but beam direction control in left and right directions is impossible.

SUMMARY OF THE DISCLOSURE

Problems to be Solved

In order to solve the above problem of the related art, the present invention provides a terahertz band beamforming antenna system.

In addition, the present invention is to provide a terahertz band beamforming antenna system which may remove transmission loss by sealing a PCB antenna with a metal waveguide.

In addition, the present invention is to provide a terahertz band beamforming antenna system which is capable of manufacturing a terahertz band 2D beamforming array antenna by laminating a special waveguide sealing.

Means to Solve the Problems

In order to achieve the above objects, according to an aspect of the present invention, disclosed is a terahertz band beamforming antenna system.

According to an embodiment of the present invention, a terahertz band beamforming antenna system includes: a metal waveguide top portion; and a metal waveguide bottom portion which is coupled to the metal waveguide top portion, and at which an antenna portion including a feed transmission line and a radiation antenna is positioned, wherein the metal waveguide top portion and the metal waveguide bottom portion may have radiation openings, and may be coupled to seal at least a top surface, a bottom surface, and both side surfaces of the antenna portion.

A plurality of structures in which the meal waveguide top portion and the metal waveguide bottom portion are coupled may be laminated.

The antenna portion may include a channel-specific feed transmission line and a radiation antenna, and bottom surfaces, top surfaces, and both side surfaces of the feed transmission line and the radiation antenna of each channel may be individually sealed by a metallic material.

The antenna portion may be coupled to an IC chip supplying radiation power for each channel by using a bonding wire.

The metal waveguide bottom portion may have an input feed network instead of the IC chip for supplying the radiation power, and the input feed network may include an input waveguide; a channel separation unit connected to the input waveguide, and binary dividing each waveguide end in an E-plane direction N times to form a $2^N$ channel waveguide structure, and an extension waveguide portion extended in the E-plane direction at an end of the $2^N$ channel waveguide structure.

The antenna portion may be positioned in a partial area of the extension waveguide portion.

A cover may be formed, which covers a front surface with the radiation opening in the structure in which the metal waveguide top portion and the metal waveguide bottom portion are coupled, and the cover should be made of a low-loss dielectric material.

Advantageous Effects

According to an embodiment of the present invention, by providing a terahertz band beamforming antenna system, antenna feed line loss performance can be improved by sealing a PCB antenna with a metal waveguide.

Further, according to the present invention, a terahertz band 2D beamforming array antenna can be manufactured by laminating a special waveguide sealing an antenna.

DETAILED DESCRIPTION

The singular form used in the present specification may include the plural form unless the context clearly dictates otherwise. In the present specification, the term such as “comprising” or “including” should not be construed as necessarily including all various components or various steps disclosed in the specification, and should be construed that some of the components or the steps may not be included or additional components or steps may be further included. In addition, the terms including “part’, “module” and the like disclosed in the specification mean a unit that processes at least one function or operation and it may be implemented by hardware or software, or a combination of hardware and software.

Hereinafter, an embodiment of the present invention will be described in detail with reference to the accompanying drawings.

Figure 1:
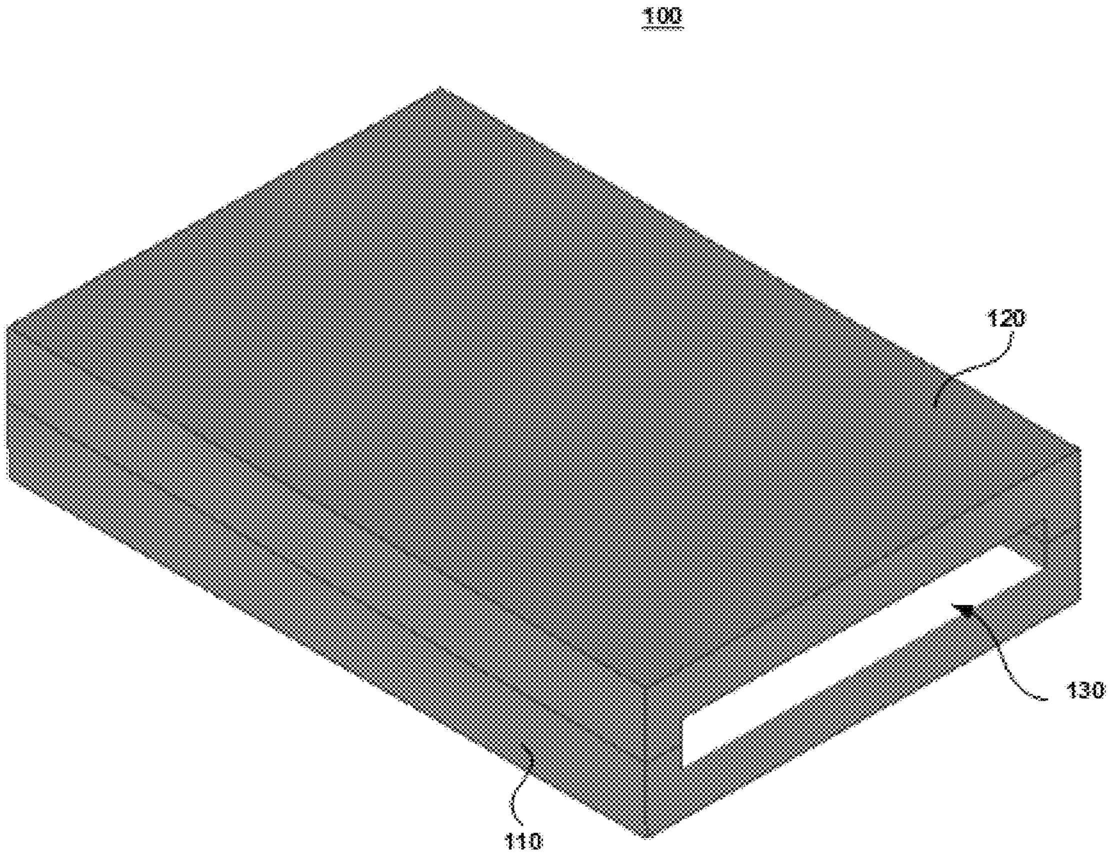
FIG. 1 is a diagram showing a terahertz band beamforming antenna system according to an embodiment of the present invention.
Figure 2:
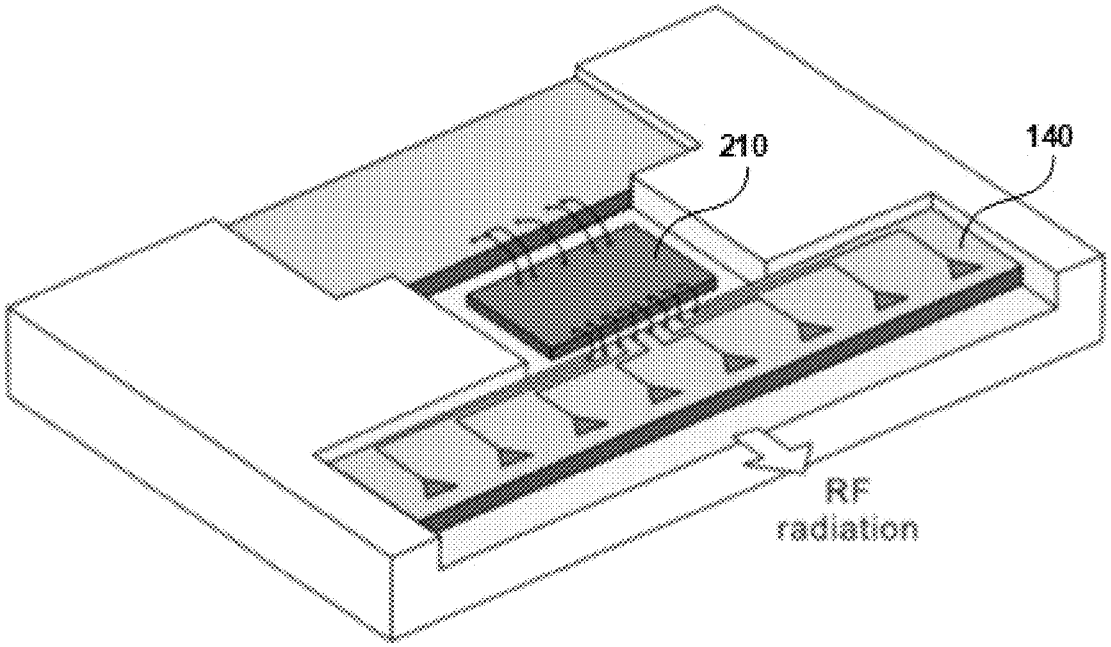
FIG. 2 is a diagram illustrating an internal structure of a metal bottom waveguide according to an embodiment of the present invention.
Figure 3:
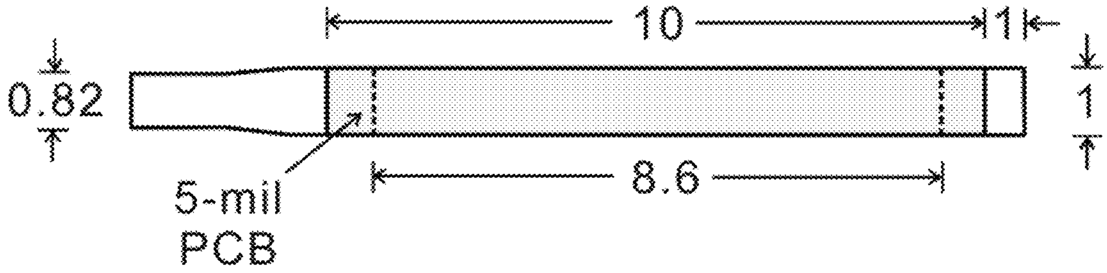
FIG. 3 is a top view of a metal waveguide in which a single antenna is positioned according to an embodiment of the present invention.
Figure 4:
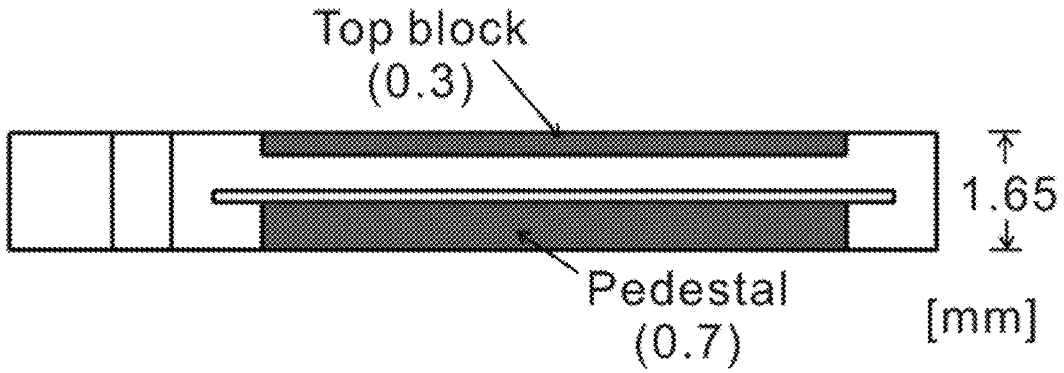
FIG. 4 is a side view of FIG. 3.
Figure 5:
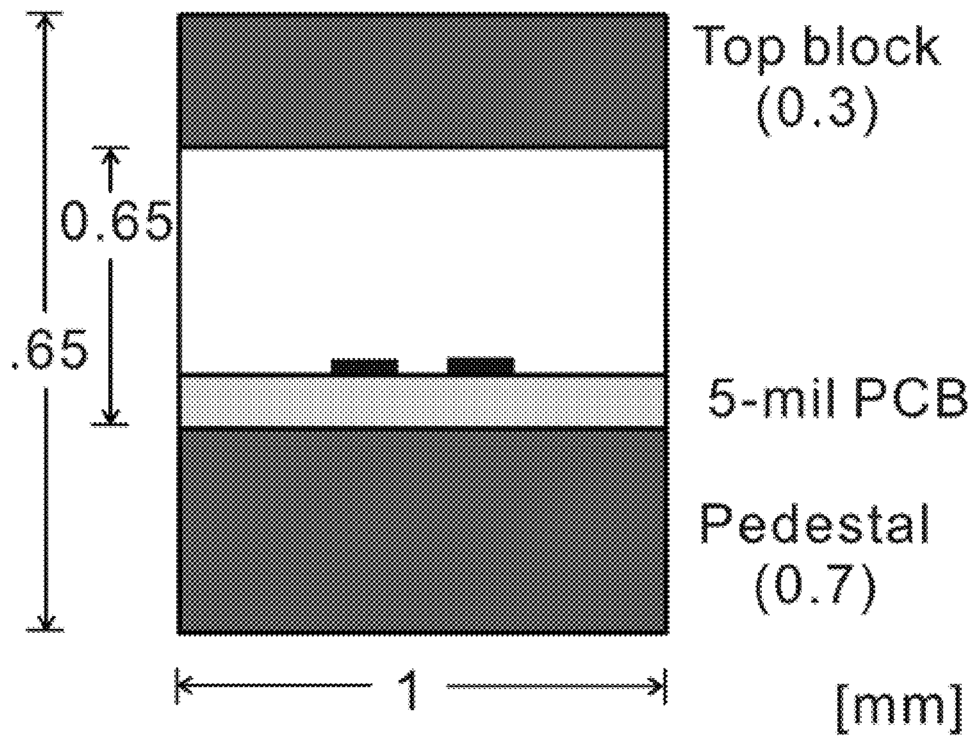
FIG. 5 is a front view of FIG. 3.
Figure 6:
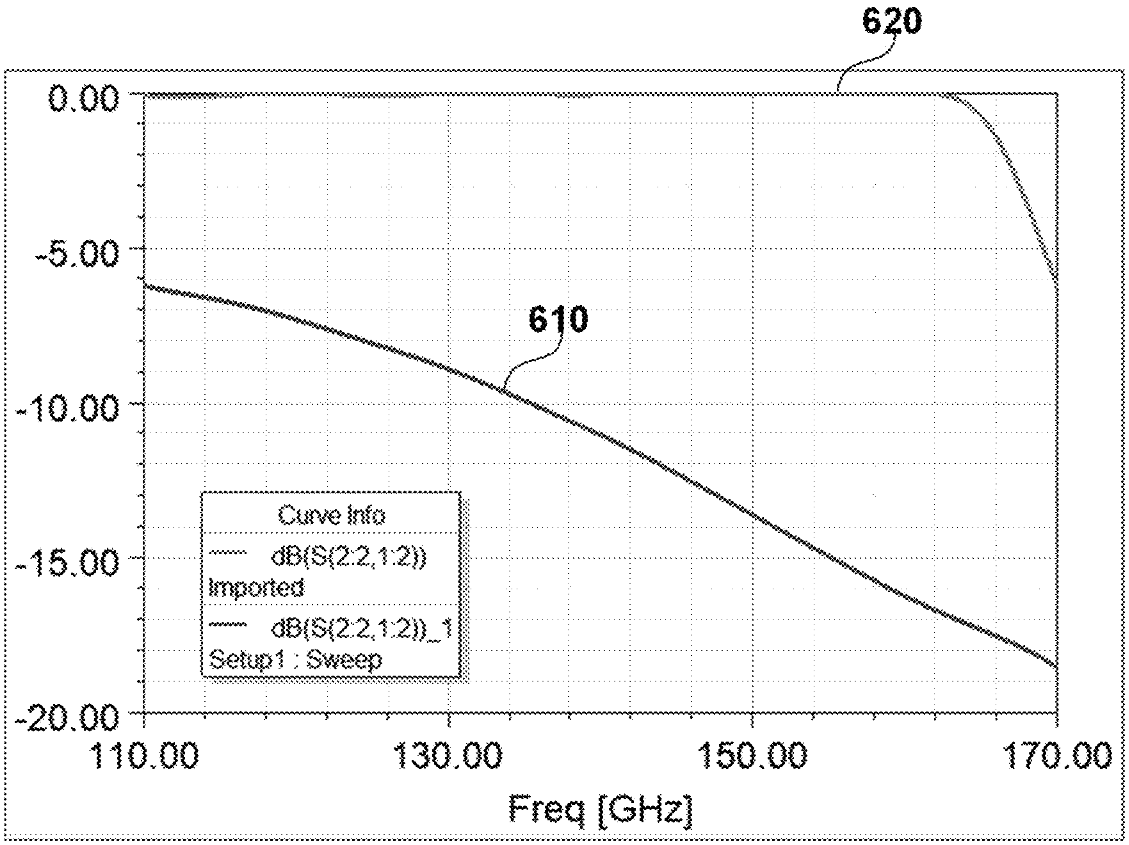
FIG. 6 is a diagram showing a result of simulating transmission loss of a single antenna system of FIG. 3.
Figure 7:
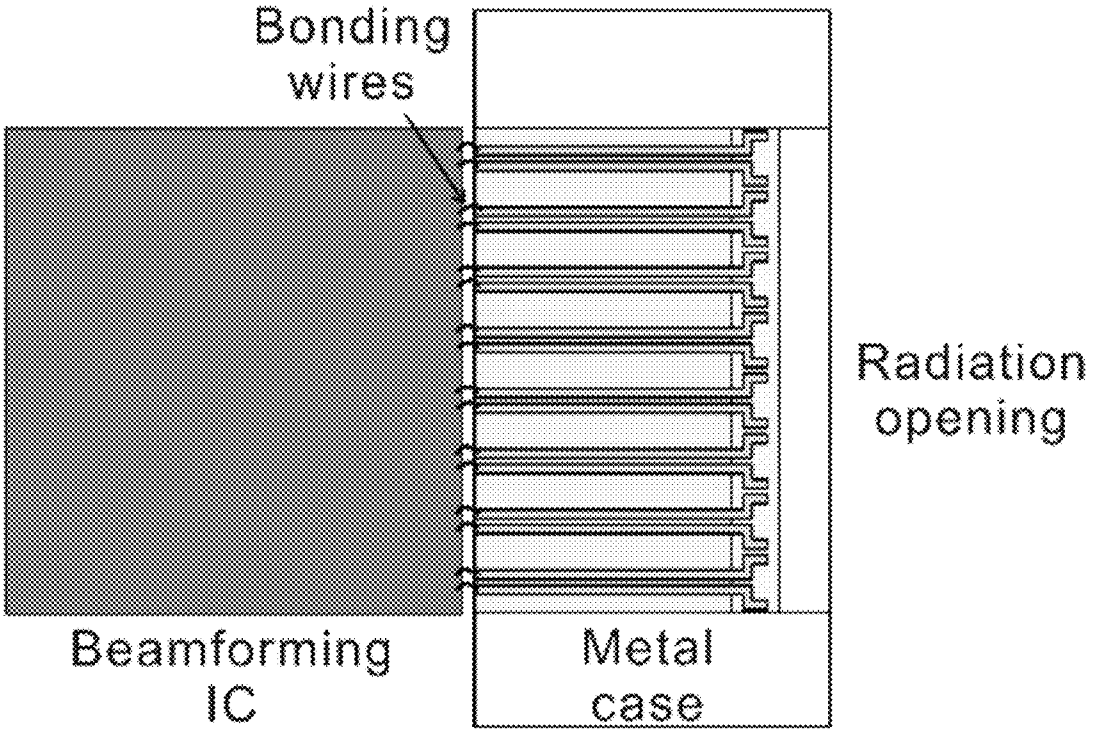
FIG. 7 is a diagram showing a terahertz band beamforming antenna system according to another embodiment of the present invention.
Figure 8:
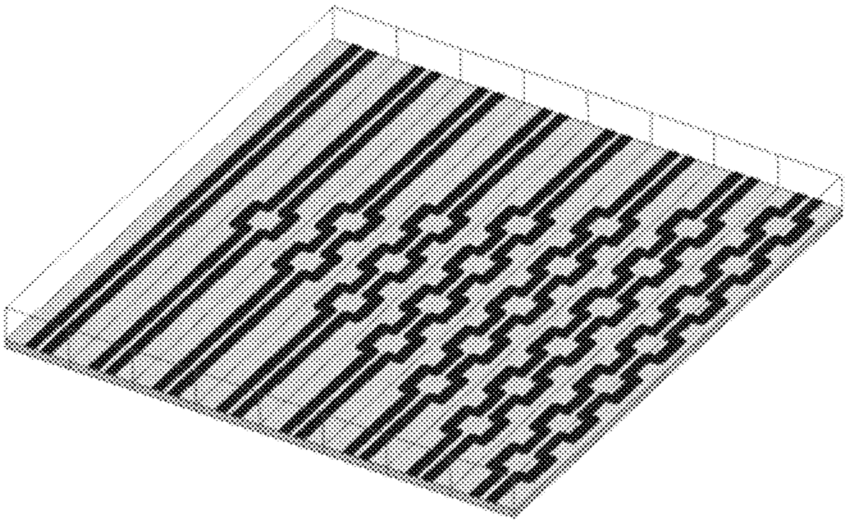
FIG. 8 is a diagram showing a terahertz band beamforming antenna system according to yet another embodiment of the present invention.
Figure 9:
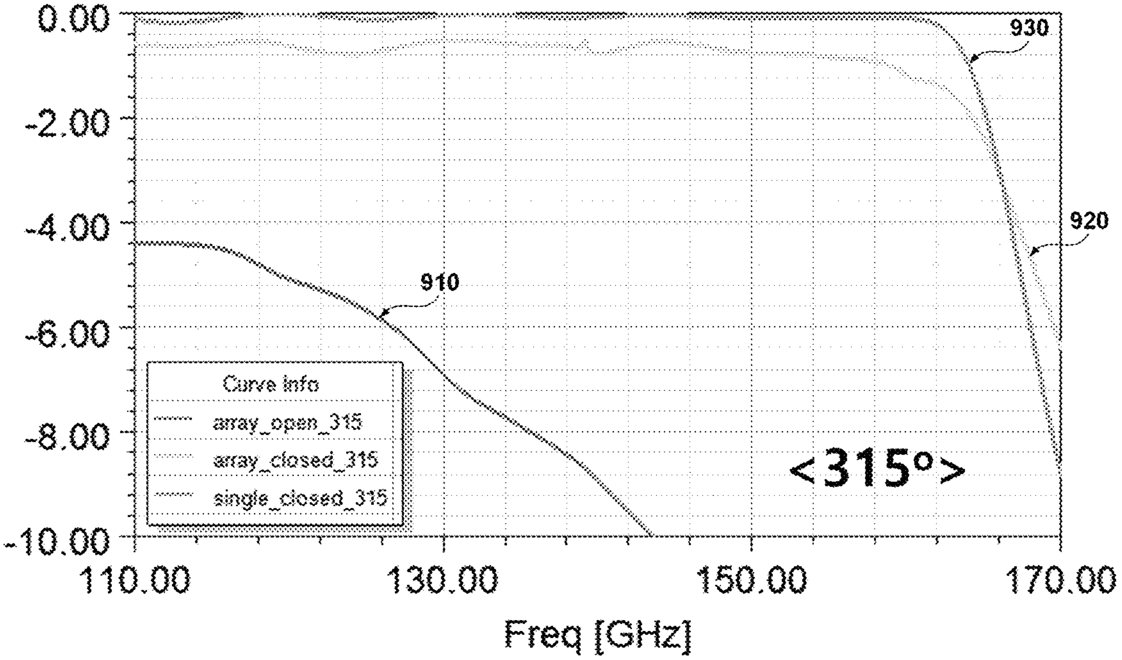
FIG. 9 is a diagram showing a result of simulating transmission loss of an array antenna system of FIGS. 7 and 8.
Figure 10:
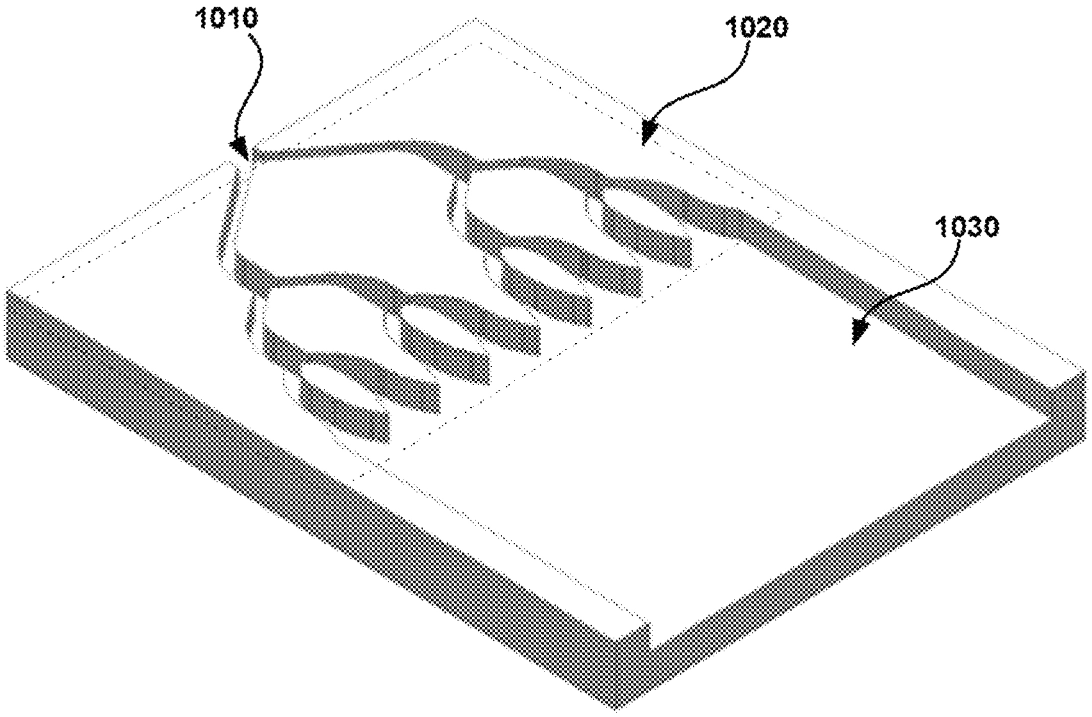
FIG. 10 is a diagram showing a metal bottom waveguide structure according to another embodiment of the present invention.
Figure 11:
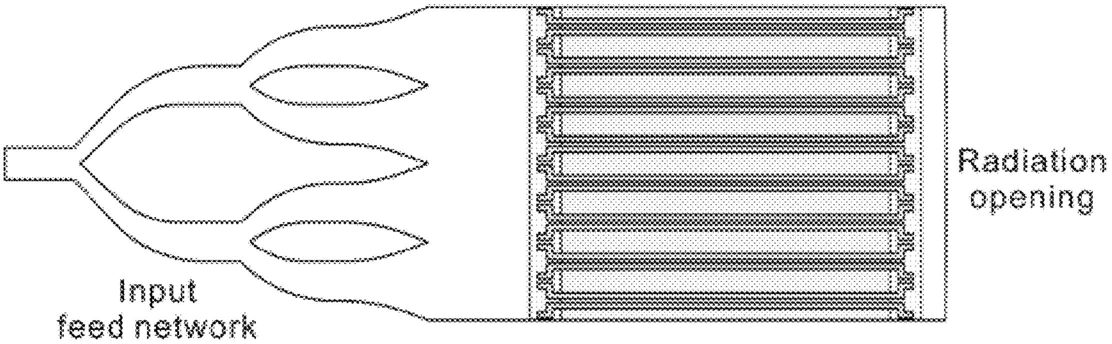
FIG. 11 is a diagram showing an example in which an antenna portion is disposed in FIG. 10.
Figure 12:
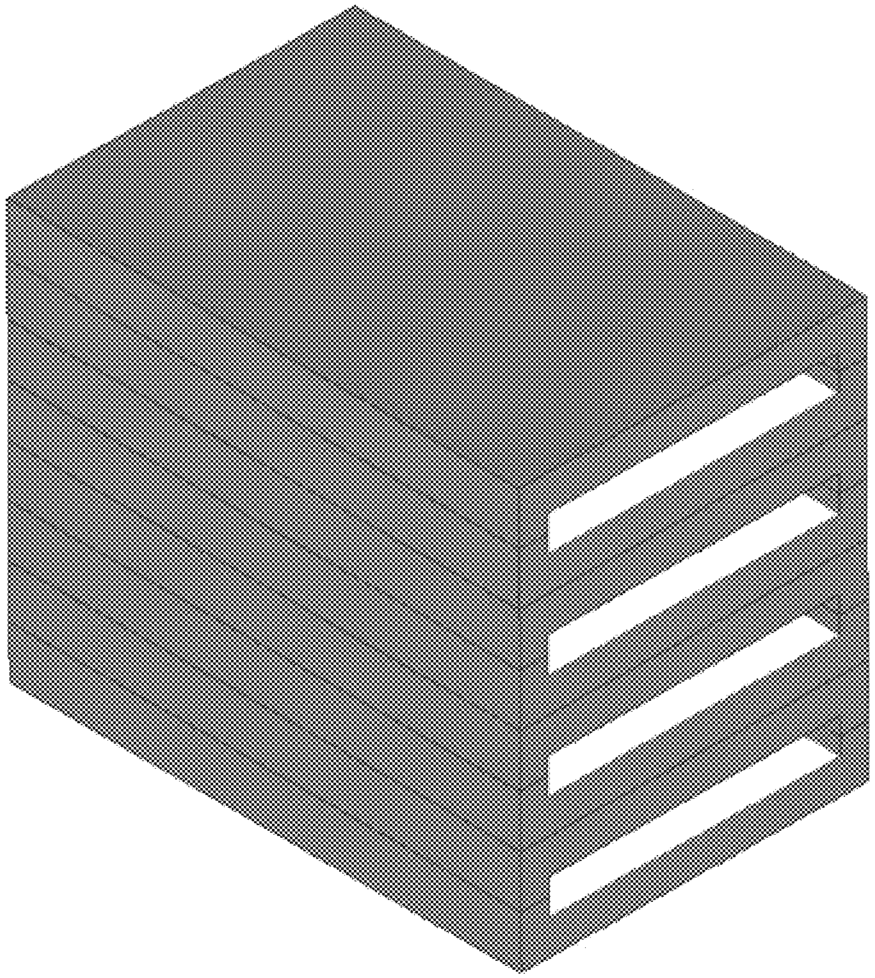
FIG. 12 is a diagram showing a lamination structure of a terahertz band beamforming antenna system according to an embodiment of the present invention.
Figure 13:
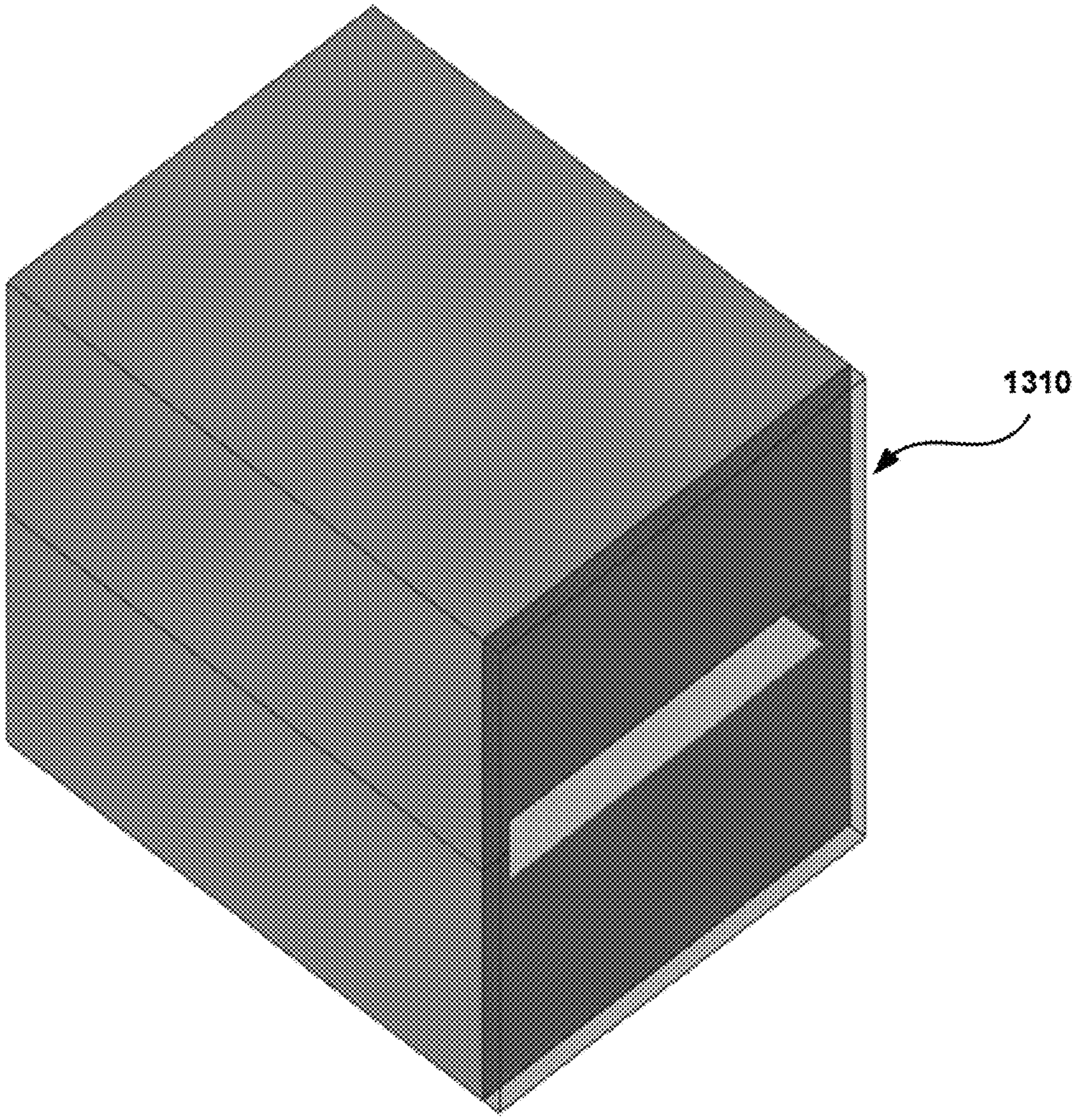
FIG. 13 is a diagram showing an example in which a cover is formed in a radiation opening according to an embodiment of the present invention.

FIG. 1 is a diagram showing a terahertz band beamforming antenna system according to an embodiment of the present invention, FIG. 2 is a diagram illustrating an internal structure of a metal bottom waveguide according to an embodiment of the present invention, FIG. 3 is a top view of a metal waveguide in which a single antenna is positioned according to an embodiment of the present invention, FIG. 4 is a side view of FIG. 3, FIG. 5 is a front view of FIG. 3, FIG. 6 is a diagram showing a result of simulating transmission loss of a single antenna system of FIG. 3, FIG. 7 is a diagram showing a terahertz band beamforming antenna system according to another embodiment of the present invention, FIG. 8 is a diagram showing a terahertz band beamforming antenna system according to yet another embodiment of the present invention, FIG. 9 is a diagram showing a result of simulating transmission loss of an array antenna system of FIGS. 7 and 8, FIG. 10 is a diagram showing a metal bottom waveguide structure according to another embodiment of the present invention, FIG. 11 is a diagram showing an example in which an antenna portion is disposed in FIG. FIG. 12 is a diagram showing a lamination structure of a terahertz band beamforming antenna system according to an embodiment of the present invention, and FIG. 13 is a diagram showing an example in which a cover is formed in a radiation opening according to an embodiment of the present invention.

Referring to FIG. 1, a terahertz band beamforming antenna system 100 according to an embodiment of the present invention is configured to include a metal waveguide bottom portion 110 and a metal waveguide top portion 120.

The metal waveguide bottom portion 110 may be coupled to the metal waveguide top portion 120, and may have an antenna portion 140 positioned therein.

The metal waveguide bottom portion 110 and the metal waveguide top portion 120 are coupled to have a radiation opening 130, and the antenna portion 140 may be coupled so that at least a bottom surface, a top surface, and both side surfaces are sealed with a metal waveguide by the coupling of the metal waveguide bottom portion 110 and the metal waveguide top portion 120.

The antenna portion 140 may be sealed by metal except for the radiation opening 130 by coupling the metal waveguide bottom portion 110 and the metal waveguide top portion 120.

In FIG. 2, an example of the metal waveguide bottom portion 110 is shown.

Referring to FIG. 2, the antenna portion 140 may be positioned at the metal waveguide bottom portion 110 according to an embodiment of the present invention. Here, the antenna portion 140 may be an array antenna.

That is, as illustrated in FIG. 2, the antenna portion 140 is an array antenna capable of radiating to a plurality of channels, and may be configured to include a channel-specific feed transmission line and a radiation antenna. As such, the antenna portion 140 may be positioned inside the metal waveguide to control a radiation beam direction to face an exit of the metal waveguide.

An internal space may be formed at the metal waveguide bottom portion 110 so that the antenna portion 140 may be disposed. The internal space in which the antenna portion 140 of the metal waveguide bottom portion 110 is positioned may be extended and formed in an E-plane direction according to the number of antenna elements (i.e., each channel feed transmission line and radiation antenna) constituting the array antenna. In an embodiment of the present invention, by assuming the antenna portion 140 consisting of the feed transmission line and the radiation antenna is positioned at the metal waveguide bottom portion 110, this is primarily described, but it is natural that a circuit may also be added to the feed transmission line. Further, a length of the feed transmission line may also be formed variously. Further, the feed transmission line may also be formed in various patterns according to a beam pattern.

As illustrated in FIG. 2, the antenna portion 140 may include the feed transmission line and the radiation antenna. The antenna portion 140 positioned at the metal waveguide bottom portion 110 may receive power from a beamforming IC chip 210. To this end, as shown in FIG. 2, the antenna portion 140 may be coupled to the beamforming IC chip 210 by a bonding wire. That is, the antenna portion 140 is coupled to the beamforming IC chip 210 by the bonding wire for each channel, and the power may be supplied to the channel-specific feed transmission line of the antenna portion 140 for each channel, and then radiated through the radiation antenna connected to an end of the feed transmission line.

As such, the antenna portion 140 is positioned inside the metal waveguide to remove the transmission loss of the feed transmission line and enhance the beam pattern of the radiation antenna.

FIG. 3 is a top view of a metal waveguide in which a single antenna is positioned according to an embodiment of the present invention, FIG. 4 is a side view of FIG. 3, and FIG. 5 is a front view of FIG. 3.

As shown in FIGS. 3 to 5, the single antenna may be positioned at a metal waveguide top portion 120 and the metal waveguide bottom portion 110. The single antenna may include the feed transmission line and the radiation antenna, and may be sealed by the metal waveguide top portion 120 and the metal waveguide bottom portion 110 except for the radiation opening. When the feed transmission line and the radiation antenna are packaged inside the metal waveguide, there may be no transmission loss of the feed transmission line and the radiation antenna may also radiate in the direction of the radiation opening 140 instead of radiating omnidirectionally.

FIG. 6 is a diagram showing a result of simulating transmission loss of a single antenna system of FIGS. 3 to 5.

Reference numeral 610 of FIG. 6 represents a result of simulating the transmission loss when the single antenna is not packaged inside the metal waveguide and reference numeral 620 of FIG. 6 represents a result of simulating the transmission loss when the single antenna system is packaged inside the metal waveguide.

As shown in reference numeral 610 of FIG. 6, it can be seen that when the feed transmission line and the radiation antenna are positioned outside, opening type loss of 13 dB is generated, but when the feed transmission line and the radiation antenna are positioned inside the metal waveguide, the radiation loss is perfectly removed as represented by reference numeral 620 of FIG. 6.

FIG. 7 is a diagram showing an array antenna system according to another embodiment of the present invention. FIG. 7 is a diagram showing an example in which a 8-array antenna system is sealed inside the metal waveguide. As such, all of a plurality of array antenna systems are positioned in the internal space of the metal waveguide to be disposed in a sealing form except for the radiation opening.

As another example, each channel-specific feed transmission line and the radiation antenna of the array antenna system may be individually positioned in the internal space of the metal waveguide in a separated sealing structure (see FIG. 8).

As shown in reference numeral 930 of FIG. 9, it can be seen that in a structure in which each channel-specific feed transmission line and the radiation antenna are individually sealed in the internal space of the metal waveguide, the transmission loss is small.

Reference numeral 910 of FIG. 9 is a result of simulating the transmission loss when the feed transmission line and the radiation antenna are not positioned inside the metal waveguide, and it can be seen that the loss of the feed transmission line is large in an opening environment.

Further, reference numeral 920 of FIG. 9 is a result of simulating the transmission loss when the entire array antenna system is sealed by one metal waveguide, and it may be confirmed that a sealing space is extended to be large, so the radiation loss may not be perfectly removed, but loss performance is significantly improved as compared with reference numeral 910.

FIG. 10 is a diagram showing a structure of the metal waveguide bottom portion 110 according to another embodiment of the present invention.

According to another embodiment of the present invention, the metal waveguide bottom portion 110 may include an input feed network structure for supplying the power to the antenna portion 140 positioned at the metal waveguide bottom portion 110. The input feed network structure is a structure used for confirming an antenna performance without the IC chip, and the input feed network structure is not used in the structure including the beamforming IC chip.

The input feed network may be constituted by an input waveguide 1010, a channel separation unit 1020, and an extension waveguide 1030.

The input waveguide 1010 is supplied with radio waves from a signal processing unit (not shown) positioned at a front stage, and transfers the radio waves to the channel separation unit 1020.

The channel separation unit 1020 is a means connected to the input waveguide 1010, and binary-dividing the waveguide and forming a $2^N$ channel waveguide structure equally distributing the radio waves supplied through the input waveguide 1010.

This will be described in more detail.

The channel separation unit 1020 may binary-divide the end of the waveguide N times (here, N is a natural number), and form the $2^N$ channel waveguide structure. That is, the end of the input waveguide 1010 is binary-divided in the E-plane direction to form a 2-channel waveguide, and each end of the 2-channel waveguide is binary-divided in the E-plane direction again to form a 4-channel waveguide. Similarly, each end of the 4-channel waveguide is binary-divided in the E-plane direction to form an 8-channel waveguide.

As such, each end point of the waveguide of the channel separation unit 1020 is binary-divided to form the $2^N$ channel waveguide structure, so the radio waves transferred through the input waveguide 1010 may be equally distributed and transferred to respective channel waveguides.

In an embodiment of the present invention, in order to achieve the convenience of understanding and description, it is assumed and described that the waveguide is binary-divided 3 times by the channel separation unit 1020 to form the 8-channel waveguide structure, but the number of binary-dividing times/channel waveguide structure of the waveguide may be adaptively changed according to an implementation environment such as a width of the waveguide, the number of required channels, a power distribution structure, a size of the antenna portion 140 positioned in the extension waveguide 1030, etc.

When summarized again, the channel separation unit 1020 may binary-divide the end of the waveguide in the E-plan direction N times and form the $2^N$ channel waveguide structure to equally distribute the radio waves supplied through the input waveguide 1010 through the $2^N$ channel waveguide structure.

The extension waveguide 1030 is a waveguide connected to the channel separation unit 1020 and having a length extended in the E-plane direction. FIG. 9 shows a form in which the waveguide is connected at the end of the $2^N$ channel waveguide structure.

The antenna portion 140 is positioned in a partial area in the extension waveguide 1030 as shown in FIG. 11, and as a result, the extension waveguide 1030 serves to directly supply the radio waves to the antenna portion 140.

That is, the extension waveguide 1030 is connected to the end of the $2^N$ channel waveguide as shown in FIG. 10, and as a result, the radio waves transferred through the input waveguide 1010 may be equally distributed through the $2^N$ channel waveguide structure and output to the extension waveguide 1030 at the end of the $2^N$ channel waveguide structure. Therefore, the antenna portion 140 positioned inside the extension waveguide 1030 may be supplied with the radio waves equally distributed to the extension waveguide 1030.

The radio waves transferred through the input waveguide 1010 may be equally distributed through the $2^N$ channel waveguide structure and output to the extension waveguide 1030 at the end of the $2^N$ channel waveguide structure.

In FIG. 1, it is shown that only one metal waveguide bottom portion 110 and only one metal waveguide top portion 120 are formed. However, as illustrated in FIG. 12, a plurality of structures in which the metal waveguide bottom portion 110 and the metal waveguide top portion 120 are coupled may be laminated to complete a 2-D array system.

Further, as shown in FIG. 13, in the structure in which the metal waveguide bottom portion 110 and the metal waveguide top portion 20 are coupled, the radiation opening may also be covered with a dielectric-material cover 1310.

The present invention has been described above mainly with reference to the embodiments thereof. It is understood to those skilled in the art that the present invention may be implemented as a modified form without departing from an essential characteristic of the present invention. Therefore, the disclosed embodiments should be considered in an illustrative viewpoint rather than a restrictive viewpoint. The scope of the present invention is defined by the appended claims rather than by the foregoing description, and all differences within the scope of equivalents thereof should be construed as being included in the present invention.

What is claimed is:

1. A terahertz band beamforming antenna system, comprising:

a metal waveguide top portion; and a metal waveguide bottom portion which is coupled to the metal waveguide top portion, and at which an antenna portion including a feed transmission line and a radiation antenna is positioned, wherein the metal waveguide top portion and the metal waveguide bottom portion are coupled to form a single radiation opening, and are coupled such that the metal waveguide top portion and the metal waveguide bottom portion enclose at least a top surface, a bottom surface, and both side surfaces of the antenna portion.

2. The terahertz band beamforming antenna system of claim 1, wherein a plurality of structures in which the metal waveguide top portion and the metal waveguide bottom portion are coupled are laminated.

3. The terahertz band beamforming antenna system of claim 1, wherein the antenna portion includes a channel-specific feed transmission line and a radiation antenna, and bottom surfaces, top surfaces, and both side surfaces of the feed transmission line and the radiation antenna of each channel are individually sealed by a metallic material.

4. The terahertz band beamforming antenna system of claim 1, wherein the antenna portion is coupled to an IC chip supplying radiation power for each channel by using a bonding wire.

5. The terahertz band beamforming antenna system of claim 1, wherein the metal waveguide bottom portion has an input feed network for supplying the radiation power, and the input feed network comprises:

an input waveguide;

a channel separation unit connected to the input waveguide, and binary dividing each waveguide end in an E-plane direction N times to form a $2^N$ channel waveguide structure; and an extension waveguide portion extended in the E-plane direction at an end of the $2^N$ channel waveguide structure.

6. The terahertz band beamforming antenna system of claim 5, wherein the antenna portion is positioned in a partial area of the extension waveguide portion.

7. The terahertz band beamforming antenna system of claim 1, wherein a cover is formed, which covers a front surface with the radiation opening in the structure in which the metal waveguide top portion and the metal waveguide bottom portion are coupled, and the cover is made of a different material from the metal waveguide.

* * * * *